United States Patent
Tour et al.

(10) Patent No.: US 9,511,346 B2
(45) Date of Patent: Dec. 6, 2016

(54) ADSORPTION OF ACTINIDES IN CATIONIC FORM FROM AQUEOUS SOLUTIONS

(76) Inventors: James M. Tour, Bellaire, TX (US); Alexander Slesarev, Obninsk (RU); Dmitry V. Kosynkin, Dhahran (SA); Anna Y. Romanchuk, Moscow (RU); Stepan N. Kalmykov, Moscow (RU)

( * ) Notice: Subject to any disclaimer, the term of this patent is extended or adjusted under 35 U.S.C. 154(b) by 410 days.

(21) Appl. No.: 14/001,255

(22) PCT Filed: Feb. 27, 2012

(86) PCT No.: PCT/US2012/026766
§ 371 (c)(1),
(2), (4) Date: Nov. 26, 2013

(87) PCT Pub. No.: WO2012/170086
PCT Pub. Date: Dec. 13, 2012

(65) Prior Publication Data
US 2014/0081067 A1     Mar. 20, 2014

Related U.S. Application Data

(60) Provisional application No. 61/446,535, filed on Feb. 25, 2011.

(51) Int. Cl.
B01J 20/00     (2006.01)
B01J 20/32     (2006.01)
(Continued)

(52) U.S. Cl.
CPC ............ B01J 20/00 (2013.01); B01J 20/0296 (2013.01); B01J 20/205 (2013.01);
(Continued)

(58) Field of Classification Search
CPC ............ G21F 9/007; G21F 9/12; C02F 1/28; C02F 1/281; C02F 1/283; C02F 1/288; C02F 2101/006; B01J 20/3204; B01J 20/3244; B01J 20/0296; B01J 20/205; B01J 20/00; B01J 20/327; B01J 20/3272
See application file for complete search history.

(56) References Cited

U.S. PATENT DOCUMENTS 5,366,634 A * 11/1994 Vijayan .................. B01D 61/16
                                                            210/638
5,788,865 A *  8/1998 Smirnov ................. C02F 1/681
                                                            210/690
(Continued)

FOREIGN PATENT DOCUMENTS

CN        101973620            2/2011
JP        2003-192316    *      9/2003
(Continued)

OTHER PUBLICATIONS

Bradder et al, Dye Adsorption on Layered Graphite Oxide, Dec. 2010, J. Chem. Eng. Data, vol. 56, pp. 138-141.*
(Continued)

*Primary Examiner* — Matthew O Savage

(57) ABSTRACT

Various aspects of the present invention pertain to methods of sorption of various materials from an environment, including radioactive elements, chlorates, perchlorates, organohalogens, and combinations thereof. Such methods generally include associating graphene oxides with the environment. This in turn leads to the sorption of the materials to the graphene oxides. In some embodiments, the methods of the present invention also include a step of separating the graphene oxides from the environment after the sorption of the materials to the graphene oxides. More specific aspects of the present invention pertain to methods of sorption of radionuclides (such as actinides) from a solution by associating graphene oxides with the solution and optionally separating the graphene oxides from the solution after the sorption.

6 Claims, 7 Drawing Sheets

(51) Int. Cl.
 *B01J 20/02* (2006.01)
 *B01J 20/20* (2006.01)
 *C02F 101/00* (2006.01)
 *C02F 1/28* (2006.01)
 *G21F 9/12* (2006.01)

(52) U.S. Cl.
 CPC ......... *B01J 20/3204* (2013.01); *B01J 20/327* (2013.01); *B01J 20/3244* (2013.01); *B01J 20/3272* (2013.01); *C02F 1/283* (2013.01); *C02F 2101/006* (2013.01); *G21F 9/12* (2013.01)

(56) References Cited

U.S. PATENT DOCUMENTS

| | | | |
|---|---|---|---|
| 2005/0067346 | A1 | 3/2005 | Noack et al. |
| 2009/0036605 | A1 | 2/2009 | Ver Meer |
| 2009/0301169 | A1 | 12/2009 | Higgins et al. |
| 2010/0105834 | A1 | 4/2010 | Tour et al. |
| 2010/0323177 | A1 | 12/2010 | Ruoff et al. |
| 2012/0171093 | A1* | 7/2012 | Swager ............... C01B 31/0213 423/219 |
| 2012/0208088 | A1 | 8/2012 | Xie et al. |

FOREIGN PATENT DOCUMENTS

| | | | | |
|---|---|---|---|---|
| WO | WO 2006/022599 | A1 * | 3/2006 | ............... C02F 1/283 |
| WO | WO 2007073793 | * | 7/2007 | |
| WO | WO 2010022164 | * | 2/2010 | |
| WO | WO 2011016889 | * | 2/2011 | |

OTHER PUBLICATIONS

Amanda L. Higginbotham, et al., "Lower-Defect Graphene Oxide Nanoribbons from Multiwalled Carbon Nanotubes", "ACS Nano", Mar. 4, 2010, pp. 2059-2069, vol. 4, No. 4, Publisher: American Chemical Society.

Dmitry V. Kosynkin, et al., "Highly Conductive Graphene Nanoribbons by Longitudnal Splitting of Carbon Nanotubes Using Potassium Vapor", "ACS Nano", Jan. 4, 2011, pp. 968-974, vol. 5, No. 2, Publisher: American Chemical Society.

Kinga Haubner, et al., "The Route to Functional Graphene Oxide", "ChemPhysChem", May 21, 2010, pp. 2131-2139, vol. 11, No. 10, Publisher: Wiley-VCH.

Daniela C. Marcano, et al., "Improved Synthesis of Graphene Oxide", "ACS Nano", Jul. 22, 2010, pp. 4806-4814, vol. 4, No. 8, Publisher: American Chemical Society.

Sheng-Tao Yang, et al., "Removal of Methylene Blue From Aqueous Solution by Graphene Oxide", "J. Colloid & Interface Science", Mar. 6, 2011, pp. 24-29, vol. 359, Publisher: Elsevier, Inc.

Philip Bradder, et al., "Dye Adsorption on Layered Graphite Oxide", "J. Chem. Eng. Data", Dec. 20, 2010, pp. 138-141, vol. 56, Publisher: American Chemical Society.

The International Searching Authority for the PCT, "Written Opinion of the ISA Under PCT Rule 43bis.1 in PCT/US2012/026766", Nov. 1, 2012.

The International Bureau of WIPO, "PCT International Preliminary Report on Patentability in PCT/US2012/026766", Aug. 27, 2013.

* cited by examiner

ADSORPTION OF ACTINIDES IN CATIONIC FORM FROM AQUEOUS SOLUTIONS

CROSS-REFERENCE TO RELATED APPLICATIONS

This application claims priority to U.S. Provisional Patent Application No. 61/446,535, filed on Feb. 25, 2011. The entirety of the above-identified provisional application is incorporated herein by reference.

STATEMENT REGARDING FEDERALLY SPONSORED RESEARCH

This invention was made with government support under the U.S. Air Force Office of Scientific Research Grant No: FA9550-09-1-0581 and the U.S. Navy Office of Naval Research Grant No: N000014-09-1-1066, both awarded by the U.S. Department of Defense. The government has certain rights in the invention.

BACKGROUND OF THE INVENTION

Current methods of purifying various environmental contaminants (including radioactive elements and halogenated compounds) have numerous limitations in terms of efficacy, costs, and efficiency. Therefore, a need exists for the development of improved methods for purifying such contaminants from various environments.

BRIEF SUMMARY OF THE INVENTION

In some embodiments, the present invention provides methods of sorption of various materials from an environment. Such methods generally include associating graphene oxides with the environment. This in turn leads to the sorption of the materials to the graphene oxides. In some embodiments, the materials comprise at least one of radioactive elements, chlorates, perchlorates, organohalogens, and combinations thereof.

In some embodiments, the methods of the present invention also include a step of separating the graphene oxides from the environment after the sorption of the materials to the graphene oxides. In various embodiments, the separation step may occur by centrifugation, ultra-centrifugation, filtration, ultra-filtration, precipitation, electrophoresis, reverse osmosis, sedimentation, incubation, treatment with acids, treatment with bases, treatment with chelating agents, and combinations of such methods.

Various methods may also be used to associate graphene oxides with the environment. In some embodiments, the association occurs by mixing the graphene oxides with the environment. In some embodiments, the association occurs by flowing the environment through a structure that contains the graphene oxides (e.g., a column).

The sorption of materials to graphene oxides may also occur by various methods. In some embodiments, the sorption includes an absorption interaction of the materials in an environment to the graphene oxides. In some embodiments, the sorption includes an ionic interaction between the materials in an environment and the graphene oxides. In some embodiments, the sorption includes an adsorption interaction between the materials in an environment and the graphene oxides. In some embodiments, the sorption includes a physisorption interaction between the materials in an environment and the graphene oxides. In some embodiments, the sorption includes a chemisorption interaction between the materials in an environment and the graphene oxides. In some embodiments, the sorption includes a covalent bonding interaction between the materials in an environment and the graphene oxides. In some embodiments, the sorption includes a non-covalent bonding interaction between the materials in an environment and the graphene oxides. In some embodiments, the sorption includes a hydrogen bonding interaction between the materials in an environment and the graphene oxides. In some embodiments, the sorption includes a van der Waals interaction between the materials in an environment and the graphene oxides. The aforementioned interactions are non-limiting and herein referred to as sorption.

Various graphene oxides may also be utilized in the methods of the present invention. For instance, the graphene oxides may be at least one of functionalized graphene oxides, pristine graphene oxides, doped graphene oxides, reduced graphene oxides, functionalized graphene oxide nanoribbons, pristine graphene oxide nanoribbons, doped graphene oxide nanoribbons, reduced graphene oxide nanoribbons, stacked graphene oxides, graphite oxides, and combinations thereof. In some embodiments, the graphene oxides may be functionalized with functional groups that comprise at least one of carboxyl groups, esters, amides, thiols, hydroxyl groups, carbonyl groups, aryl groups, epoxy groups, phenol groups, phosphonic acids, amine groups, polymers and combinations thereof. In some embodiments, the graphene oxides may be functionalized with polymers, such as polyethylene glycols, polyvinyl alcohols, poly ethylene imines, poly acrylic acids, polyamines and combinations thereof.

Furthermore, the methods of the present invention may be utilized to purify various materials from various environments. For instance, in some embodiments, the environment is an aqueous solution, such as contaminated water. In some embodiments, the environment is an atmospheric environment, such as air. In some embodiments, the environment is a solution comprising nuclear fission products.

In some embodiments, the materials to be purified include radioactive elements. In some embodiments, the radioactive elements comprise at least one of metals, salts, metal salts, radionuclides, actinides, lanthanides, and combinations thereof. In more specific embodiments, the radioactive elements in the environment include radionuclides, such as thallium, iridium, fluorine, americium, neptunium, gadolinium, bismuth, uranium, thorium, plutonium, niobium, barium, cadmium, cobalt, europium, manganese, sodium, zinc, technetium, strontium, carbon, polonium, cesium, potassium, radium, lead, actinides, lanthanides and combinations thereof. In some embodiments, the radionuclide is actinide.

In some embodiments, the materials to be purified include chlorates, such as ammonium chlorate, barium chlorate, cesium chlorate, fluorine chlorate, lithium chlorate, magnesium chlorate, potassium chlorate, rubidium chlorate, silver chlorate, sodium chlorate, and combinations thereof. In some embodiments, the materials to be purified include perchlorates, such as ammonium perchlorate, barium perchlorate, cesium perchlorate, fluorine perchlorate, lithium perchlorate, magnesium perchlorate, perchloric acid, potassium perchlorate, rubidium perchlorate, silver perchlorate, sodium perchlorate, and combinations thereof. In additional embodiments, the materials to be purified include organohalogens, such as polychlorinated biphenyls (PCB) and halogenated flame retardants.

In more specific embodiments, the methods of the present invention are used for the sorption of actinides from a solution comprising nuclear fission products. Such methods may also include a step of separating the graphene oxides from the solution comprising nuclear fission products after the sorption step.

The methods of the present invention provide various advantages, including the effective separation of various radioactive elements from various environments. For instance, in some embodiments, the methods of the present invention may be used to reduce radioactive elements in a solution by at least about 70%.

The methods of the present invention also provide various applications. For instance, in some embodiments, the methods of the present invention may be used for waste water treatment and environmental remediation applications.

BRIEF DESCRIPTION OF THE FIGURES

FIG. 1 shows data relating to the removal of various radionuclides by graphene oxide.

FIG. 3 shows sorption efficiencies of different materials that are compared along with the coagulation properties of graphene oxide solutions.

FIG. 4 shows micrographs and analyses of Pu/graphene oxide coagulates.

DETAILED DESCRIPTION OF EXEMPLARY EMBODIMENTS

Figure 1A:
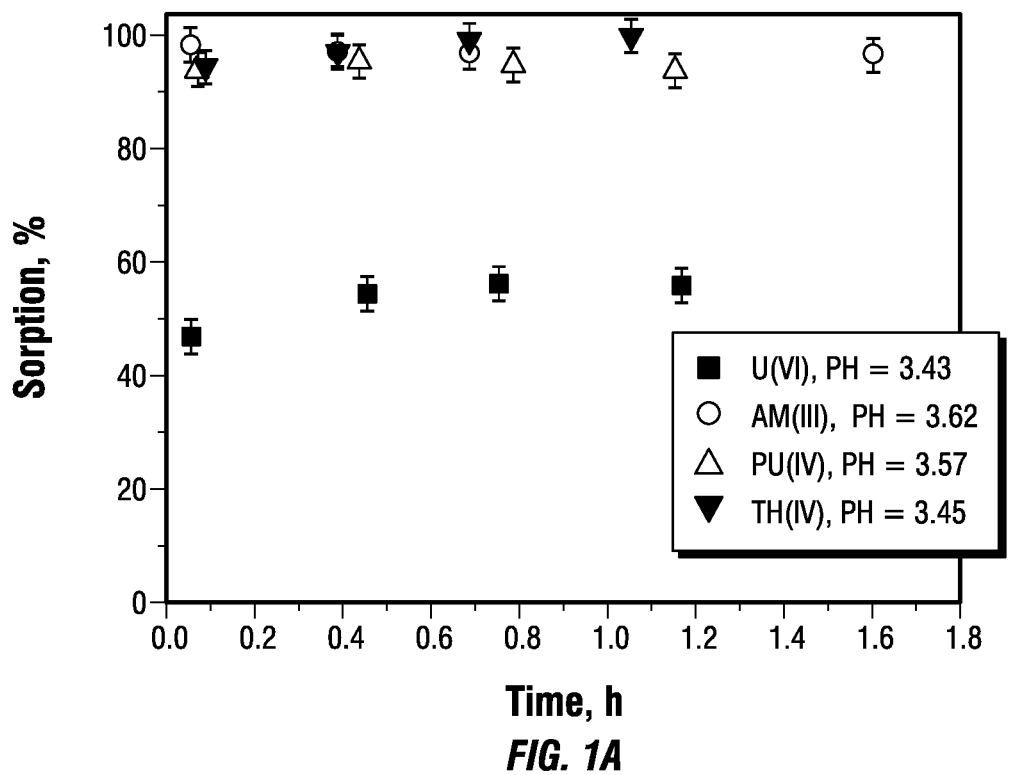
FIG. 1A shows the kinetics of U(VI), Am(III), Th(IV) and Pu(IV) sorption onto graphene oxide, indicating that steady state conditions are reached within 5 minutes.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The nuclear industry generates large amounts of radioactive wastewater that must be effectively treated before it is discharged into the environment. The toxic radioactive elements (such as radionuclides) in the wastewater cannot be effectively removed by current drinking water purification techniques. Furthermore, separation techniques involving chromatographic methods can be time-consuming and expensive. Moreover, various industries generate large amounts of halogenated by-products, such as chlorates, perchlorates, and organohalogens (e.g., polychlorinated biphenyls and halogenated flame retardants). As a result, new methods are needed for the efficient removal of radioactive and halogenated elements from various solutions and environments, especially for waste water treatment and environmental remediation applications. The present invention addresses these needs.

In some embodiments, the present invention provides methods of sorption of various materials from an environment. In some embodiments, the materials to be removed from an environment include at least one of radioactive elements, chlorates, perchlorates, organohalogens, and combinations thereof.

Such methods generally include associating graphene oxides with the environment. This in turn leads to the sorption of the materials to the graphene oxides. In some embodiments, the methods of the present invention also include a step of separating the graphene oxides from the environment after the sorption of the radioactive elements to the graphene oxides.

As set forth in more detail below, the methods of the present invention have numerous variations. For instance, the methods of the present invention may involve the purification of various materials from various environments by the use of various graphene oxides.

Materials

The methods of the present invention may be utilized to purify various materials from various environments. In some embodiments, the materials to be purified include, without limitation, radioactive elements, chlorates, perchlorates, organohalogens, and combinations thereof. In more specific embodiments, the materials to be purified include, without limitation, polycyclic aromatics, chlorinated and brominated dibenzodioxins and dibenzofurans, chlorinated biphenyls, lindane, dichlorodiphenyltrichloroethane (DDT) and other similar hydrophobic xenobiotics.

Radioactive Elements

In some embodiments, the radioactive elements to be purified from an environment are metals, salts, metal salts, radionuclides, actinides, lanthanides, and combinations thereof. In more specific embodiments, the radioactive elements in the solutions include radionuclides, such as thallium, iridium, fluorine, americium, neptunium, gadolinium, bismuth, uranium, thorium, plutonium, niobium, barium, cadmium, cobalt, europium, manganese, sodium, zinc, technetium, strontium, carbon, polonium, cesium, potassium, radium, lead, actinides, lanthanides and combinations thereof.

In more specific embodiments, the radioactive elements to be purified from various environments include, without limitation, americium(III), actinide(III), actinide(IV), thallium(IV), plutonium(IV), neptunium(V), uranium(VI), strontium(II), technetium(VII), and combinations thereof.

In more specific embodiments, the radioactive elements include, without limitation, thallium-201, iridium-192, fluorine-18, americium-241, americium-243, neptunium-237, Gd-153, niobium-93, barium-133, cadmium-109, cobalt-57, cobalt-60, europium-152, manganese-54, sodium-22, zinc-65, technetium-99, strontium-90, thallium-204, carbon-14, polonium 210, cesium-137, and combinations thereof.

In some embodiments, the radioactive elements may be naturally occurring radioactive materials (NORMs). In some embodiments, NORMs generally comprise uranium and its isotopes. In some embodiments, NORMs may also comprise thorium and its isotopes. In further embodiments, NORMs may also include potassium, lead, and polonium. NORMs are not only considered in the context of their natural abundance and distribution, but also in view of human activities that increase potential for exposure to them. In some cases, those human activities may also serve to concentrate the radionuclides present, thereby resulting in what is called technologically enhanced naturally occurring radioactive materials (TENORMs).

NORMs or TENORMs can be produced by oil and gas production and refining; mineral production; coal mining and combustion; metal mining and smelting; fertilizer production; production of mineral based building materials, including granite, stone, gypsum, and concrete; and beneficiation of mineral sands, including rare earth minerals, titanium and zirconium. NORMs and TENORMs are also present in drinking water supplies, particularly in Western US and Canada. See, e.g., http://world-nuclear.org/info/inf30.html.

While uranium and thorium-based elements are the main isotopes of NORMs and TENORMs, K-40, Po-210, Ra-226, Ra-228, and Pb-210 can also be present. NORMs and TENORMs can also include actinides and lanthanides in general. Thus, some embodiments of the present invention addresses the need for the capture and clean-up of NORMs and TENORMs.

In more specific embodiments, the radioactive elements to be purified include actinides. In some embodiments, the actinides are in a solution that contains nuclear fission products.

Chlorates and Perchlorates

The methods of the present invention may also be utilized to purify various chlorates and perchlorates. Non-limiting examples of chlorates include ammonium chloride, barium chlorate, cesium chlorate, fluorine chlorate, lithium chlorate, magnesium chlorate, potassium chlorate, rubidium chlorate, silver chlorate, sodium chlorate, and combinations thereof. Non-limiting examples of perchlorates include ammonium perchlorate, barium perchlorate, cesium perchlorate, fluorine perchlorate, lithium perchlorate, magnesium perchlorate, perchloric acid, potassium perchlorate, rubidium perchlorate, silver perchlorate, sodium perchlorate, and combinations thereof. In some embodiments, perchlorates may have similar sorption profiles to various radioactive elements, such as pertechnetate (Tc(VII)).

Organohalogens

The methods of the present invention may also be utilized to purify various organohalogens. Organohalogens generally refer to organic compounds that include one or more halogen groups. In some embodiments, the organohalogen is an organochloride. In some embodiments, the organohalogen is polychlorinated biphenyl (PCB). In some embodiments, the organohalogen is a halogenated flame retardant. In further embodiments, the organohalogens include, without limitation, chloromethanes, dichloromethanes, trichloromethanes, tetrachloromethanes, bromomethanes, bromoalkanes, bromochloromethanes, iodoalkanes, iodomethanes, organofluorines, organochlorines, acyclic organohalogens, cyclic organohalogens, and combinations thereof.

Environments

In the present invention, materials may be purified from various types of environments. In some embodiments, the environment is an atmospheric environment, such as air. In some embodiments, the environment is a solution, such as an aqueous solution. Non-limiting examples of aqueous solutions include water, such as radioactive water, contaminated water, and waste water. In some embodiments, the solution includes nuclear fission products. In some embodiments, the solution to be purified is a non-aqueous solution, such as a solution containing benzenes, toluenes, dichloromethane, and other non-aqueous solvents.

Graphene Oxides

Various graphene oxides may also be utilized in the methods of the present invention. Suitable graphene oxides include, without limitation, functionalized graphene oxides, pristine graphene oxides, doped graphene oxides, reduced graphene oxides, functionalized graphene oxide nanoribbons, pristine graphene oxide nanoribbons, doped graphene oxide nanoribbons, reduced graphene oxide nanoribbons, stacked graphene oxides, graphite oxides, and combinations thereof.

In some embodiments, the graphene oxides may be covalently or non-covalently functionalized with various functional groups, such as carboxyl groups, hydroxyl groups, carbonyl groups, aryl groups, epoxy groups, phenol groups, phosphonic acids (e.g., $RPO(OH)_2$, where R is a carbon group linked to the graphene scaffold), amine groups, esters, ether-based functional groups, polymers and combinations thereof. In some embodiments, the graphene oxides may be functionalized with polymers, such as polyethylene glycols, polyamines, polyesters, polyvinyl alcohols, poly(ethylene imines), poly(acrylic acids), and combinations thereof.

Examples of suitable polyethylene glycol functional groups include, without limitation, triethylene glycol di(p-toluenesulfonate), polyethylene glycol methyl ether tosylate, and the like. In some embodiments, polyethylene glycol functional groups on graphene oxides can be further hydrolyzed to remove most or all of any tosylate groups in order to afford terminal hydroxyl groups.

The graphene oxides of the present invention may also have various arrangements. For instance, in various embodiments, the graphene oxides of the present invention may be in stacked form. In some embodiments, the stacked graphene oxides may contain from about 2 layers to about 50 layers of graphene oxides. In some embodiments, the graphene oxides of the present invention may form a single sheet.

In some embodiments, the graphene oxides of the present invention may also include one or more layers of graphene along with the graphene oxides. Such graphenes may include, without limitation, pristine graphenes, doped graphenes, chemically converted graphenes, functionalized graphenes and combinations thereof.

In further embodiments, the graphene oxides may be graphene oxides derived from exfoliated graphite, graphene nanoflakes, or split carbon nanotubes (such as multi-walled carbon nanotubes). In more specific embodiments, the graphene oxides of the present invention may be derived from split carbon nanotubes. In various embodiments, the split carbon nanotubes may be derived from single-walled carbon nanotubes, multi-walled carbon nanotubes, double-walled carbon nanotubes, ultrashort carbon nanotubes, pristine carbon nanotubes, functionalized carbon nanotubes, and combinations thereof. In more specific embodiments, the graphene oxides of the present invention are derived from split multi-walled carbon nanotubes.

In addition, various methods may be used to split carbon nanotubes. In some embodiments, carbon nanotubes may be split by potassium or sodium metals. In some embodiments, the split carbon nanotubes may then be functionalized by various functional groups, such as alkyl groups. Additional variations of such embodiments are described in U.S. Provisional Application No. 61/534,553 entitled "One Pot Synthesis of Functionalized Graphene Oxide and Polymer/Graphene Oxide Nanocomposites." Also see Higginbotham et al., "Low-Defect Graphene Oxide Oxides from Multi-walled Carbon Nanotubes," *ACS Nano* 2010, 4, 2059-2069. Also see Applicants' co-pending U.S. patent application Ser. No. 12/544,057 entitled "Methods for Preparation of Graphene Oxides From Carbon Nanotubes and Compositions, Thin Composites and Devices Derived Therefrom." Also see Kosynkin et al., "Highly Conductive Graphene Oxides by Longitudinal Splitting of Carbon Nanotubes Using Potassium Vapor," *ACS Nano* 2011, 5, 968-974.

In various embodiments, the graphene oxides may be doped with various additives. In some embodiments, the additives may be one or more heteroatoms of B, N, O, Al, Au, P, Si or S. In more specific embodiments, the doped additives may include, without limitation, melamine, carboranes, aminoboranes, phosphines, aluminum hydroxides, silanes, polysilanes, polysiloxanes, sulfides, thiols, and combinations thereof. In more specific embodiments, the graphene oxides may be $HNO_3$ doped and/or $AuCl_3$ doped.

In various embodiments, the graphene oxides of the present invention may also be dissolved or suspended in one or more solvents before being associated with environments containing radioactive elements. Examples of suitable solvents include, without limitation, acetone, 2-butanone, dichlorobenzene, ortho-dichlorobenzene, chlorobenzene, chlorosulfonic acid, dimethyl formamide, N-methyl pyrrolidone, 1,2-dimethoxyethane, water, alcohol and combinations thereof.

In further embodiments, the graphene oxides of the present invention may also be associated with a surfactant before being associated with various environments. Suitable surfactants include, without limitation, sodium dodecyl sulfate (SDS), sodium dodecylbenzene sulfonate, Triton X-100, chlorosulfonic acid, and the like.

The graphene oxides of the present invention may have various properties. For instance, in some embodiments, the graphene oxides of the present invention have an aspect ratio in length-to-width greater than or equal to 2, greater than 10, or greater than 100. In some embodiments, the graphene oxides have an aspect ratio greater than 1000. In further embodiments, the graphene oxides of the present invention have an aspect ratio in length-to-width greater less than or equal to 2.

Furthermore, the graphene oxides of the present invention can come in the form of variable sized sheets. Such sheets may have lengths or diameters that range from about a few nanometers to a few hundred microns to several centimeters. In more specific embodiments, the graphene oxides may have lengths or diameters that range from about 1 nanometers to about 3 centimeters.

The graphene oxides of the present invention are generally hydrophilic and can be coagulated upon addition of cations or surfactants. Furthermore, in various embodiments, the surface oxidation of the graphene oxides can be gradually and systematically reduced to modify their properties. Such reduction can occur through the addition of reducing agents (e.g., hydrazine, sodium borohydride, acid or base with heat) or thermolysis (with or without $H_2$ being present).

The graphene oxides of the present invention may also have various forms. For instance, in some embodiments, the graphene oxides of the present invention may be associated with various composites. In some embodiments, such composites may include organic materials, such as synthetic polymers, natural fibers, nonwoven materials, and the like. In some embodiments, the graphene oxide composites may include inorganic materials, such as porous carbons, asbestos, Celite, diatomaceous earth, and the like. In further embodiments, the graphene oxides of the present invention may be in isolated and pure forms.

In more specific embodiments of the present invention, the graphene oxides are derived from the direct oxidation of graphite. In some embodiments, the oxidation of graphite could be through chemical methods, electrochemical methods or combinations of chemical methods and electrochemical methods that may occur simultaneously or sequentially in either order. In some embodiments, graphene oxides are derived by the chemical oxidation of graphite. Examples of methods of oxidizing graphite are disclosed in Applicants' prior work. See, e.g., Marcano, et al., "Improved Synthesis of Graphene Oxide" *ACS Nano* 2010, 4, 4806-4814. Also see U.S. Provisional Patent Application Nos. 61/180,505 and 61/185,640. Also see WO 2011/016889.

Association of Graphene Oxides with Environments

Various methods may also be used to associate graphene oxides with various environments that contain materials to be purified. In some embodiments, the association occurs by incubating the graphene oxides with the environment (e.g., an atmospheric environment). In some embodiment, the association occurs by mixing the graphene oxides with the environment (e.g., an aqueous solution). The mixing may occur by conventional methods, such as agitation, sonication, and the like.

In some embodiments, the association of graphene oxides with an environment containing materials to be purified can also occur by flowing the environment through a structure that contains the graphene oxides. In some embodiments, the structure may be a column or a sheet that contains immobilized graphene oxides.

Additional methods of associating graphene oxides with various environments can also be envisioned. Generally, such associations result in the sorption of radioactive elements in the environment to the graphene oxides.

Sorption of Materials to Graphene Oxides

The sorption of materials to graphene oxides may also occur by various methods. In some embodiments, the sorption includes an absorption of the materials in an environment to the graphene oxides. In some embodiments, the sorption includes an adsorption of the materials in an environment to the graphene oxides. In some embodiments, the sorption includes an ionic interaction between the materials in the environment and the graphene oxides. In some embodiments, the sorption includes an adsorption interaction between the materials in an environment and the graphene oxides. In some embodiments, the sorption includes a physisorption interaction between the materials in an environment and the graphene oxides. In some embodiments, the sorption includes a chemisorption interaction between the materials in an environment and the graphene oxides. In some embodiments, the sorption includes a covalent bonding interaction between the materials in an environment and the graphene oxides. In some embodiments, the sorption includes a non-covalent bonding interaction between the materials in an environment and the graphene oxides. In some embodiments, the sorption includes a hydrogen bonding interaction between the materials in an environment and the graphene oxides. In some embodiments, the sorption includes a van der Waals interaction between the materials in an environment and the graphene oxides. The aforementioned interactions are non-limiting and herein referred to as sorption.

The sorption of materials to graphene oxides may also have various effects. For instance, in some embodiments, the sorption leads to the formation of graphene oxide-cation colloids. In some embodiments, the sorption may lead to coagulation or precipitation.

Separation of Graphene Oxides from Environments

In some embodiments, the methods of the present invention also include a step of separating the graphene oxides from an environment containing various materials. The separation step generally occurs after the sorption of the materials to the graphene oxides. Various methods may be used for such separation steps. In some embodiments, the separation step may occur by centrifugation, ultra-centrifugation, filtration, ultra-filtration, precipitation, electrophoresis, sedimentation, reverse osmosis, treatment with acids, treatment with bases, treatment with chelating agents such as EDTA, and combinations of such methods.

In some embodiments, the separation step involves ultra-filtration. In more specific embodiments, the ultra-filtration step may lead to the removal of formed graphene oxide-cation colloids from an environment. In additional embodiments, the graphene oxide-cation colloids may also be removed by ultra-filtration, high speed centrifugation, sedimentation, reverse osmosis, or other suitable separation procedures.

In some embodiments, the separation step involves precipitation. In some embodiments, the precipitation can be initiated by adding one or more polymers to an environment. For instance, in some embodiments, cationic polyelectrolytes, such as poly(ethylene imine), may be added to a solution. In some embodiments, the solution may contain graphene oxide-cation coagulants that precipitate upon the addition of polymers. The precipitated coagulants may then be removed by filtration, centrifugation or other methods.

The separation step may have various effects. In some embodiments, the separation step may lead to a reduction of the radioactive elements in the environment by at least about 70%.

In some embodiments, the separated graphene oxides may then be processed further in order to dissociate the sorbed materials (such as radioactive elements). For instance, in some embodiments, the materials may be dissociated from the graphene oxides by changing the pH or temperature of a solution. The dissociated graphene oxides may then be reused.

Advantages and Applications

The methods of the present invention provide numerous applications. For instance, the methods of the present invention can be used as filters or sorbents for removal of radioactive elements and halogenated compounds from various sources. The methods of the present invention can also be used for nuclear waste treatment, and remediation of contaminated groundwater. For instance, the methods of the present invention can be used as components of ultra-filtration and reverse osmosis technologies in waste water treatment. The methods of the present invention may also be used to mitigate environmental radionuclide contamination. The methods of the present invention may also be used to separate various human-made radionuclides from aqueous solutions of various compositions. In some embodiments, graphene oxides may also be used as components of reactive barriers at contaminated sites.

In some embodiments, the methods of the present invention can be used for the sorption and separation of actinides from nuclear fission products. A classic method for this separation involves using the PUREX process. However, the PUREX process involves multiple extraction and preferential solubility steps and valence adjustments. Thus, by using graphene oxides in accordance with the methods of the present invention, one could mitigate the need for subsequent valence adjustments, extraction into organic phase, valence return, back extraction to the aqueous phase, and sometimes oxalate conversion to oxides.

To the best of Applicants' understanding, graphene oxides were not used previously for the sorption or separation of radioactive elements or halogenated compounds. Furthermore, effective separation of actinides from aqueous solutions and nuclear wastes containing strong complexing agents (such as nuclear fission products) were not previously reported.

In addition, the use of graphene oxides to purify radioactive elements and halogenated compounds from various environments provides various advantages. To begin with, graphene oxides are two-dimensional materials that consist of single atomic planes. Therefore, graphene oxides provide a high surface area and a low specific mass, especially when compared to other potential sorbents. This in turn provides graphene oxides with optimal sorption kinetics for radioactive elements.

In addition, graphene oxides are hydrophilic materials with oxygen-containing functionalities that form stable complexes with many radioactive elements, including actinides and lanthanide cations. These attributes can help lead to rapid macroscopic aggregation and precipitation of the formed complexes from various solutions, including water. This process can be further facilitated by the use of additional agents, such as surfactants and polymers.

Moreover, graphene oxides can be readily produced in mass quantities. Furthermore, the sorbed radioactive elements and halogenated compounds that are appended to graphene oxides can be liberated from the graphene oxides upon the lowering of the pH in the solution. This in turn provides for reversible leaching and sorption of radioactive elements.

Additional Embodiments

Reference will now be made to more specific embodiments of the present disclosure and experimental results that provide support for such embodiments. However, Applicants note that the disclosure below is for exemplary purposes only and is not intended to limit the scope of the claimed invention in any way.

The Examples below pertain to the use of graphene oxides for effective radionuclide removal. In particular, we show the efficacy of graphene oxide for rapid removal of some of the most toxic and radioactively long-lived human-made radionuclides from contaminated water, even in acidic solutions (pH<2). The interaction of graphene oxides with cations, including Am(III), Th(IV), Pu(IV), Np(V), U(VI) and typical fission products Sr(II) and Tc(VII) were studied, along with their sorption kinetics. Cation/graphene oxide coagulation occurs with the formation of nanoparticle aggregates on the graphene oxide surface, facilitating their removal. Graphene oxide is far more effective in removal of transuranium elements from simulated nuclear waste solutions than other routinely used sorbents such as bentonite clays, iron oxide and activated carbon. These results point toward a simple methodology to mollify the severity of nuclear waste contamination that has been spawned by humankind, thereby leading to effective measures for environmental remediation.

Treatment of aqueous waste effluents and contaminated groundwater containing human-made radionuclides, among which the transuranic elements are the most toxic, is an essential task in the clean-up of nuclear legacy sites. The recent accident that included radionuclide release to the environment at the Fukushima Daiichi nuclear power plant in Japan and the contamination of the water used for cooling its reactor cores, underscores the need for effective treatment methods of radionuclide-contaminated water. Such technologies should be inexpensive, swift, effective and environmentally friendly. Graphene oxide has been known for more than a century, but has attracted attention in the last decade due to its conversion to graphene.

The colloidal properties of graphene oxide make it a promising material in rheology and colloidal chemistry. The amphiphilic graphene oxide produces stable suspensions when dispersed in liquids and shows excellent sorption capacities. Previously, it was shown that graphene oxide enables effective removal of $Cu^{2+}$, arsenate, and organic solvents. As a result of oxygen functionalization, the graphene oxide surface contains epoxy, hydroxyl and carboxyl groups that are responsible for interaction with cations and anions. In this work, the application of graphene oxide for the effective removal of a variety of radionuclides from aqueous solutions is described. Kinetics of sorption, pH sorption edges and sorption capacity were studied in the batch sorption mode to illustrate the performance of graphene oxide in sequestering radionuclides from solution.

Example 1

Kinetics of Radionuclide Removal

The kinetics of radionuclide removal by graphene oxide are presented in FIG. 1A, indicating that near steady state conditions were achieved within 5 minutes even at very low graphene oxide concentrations (<0.1 g/L by carbon). Without being bound by theory, it is envisioned that the fast sorption kinetics are likely due to graphene oxide's highly accessible surface area and lack of internal surfaces that usually contribute to the slow kinetics of diffusion in cation-sorbent interaction. This fast kinetics are of importance for practical applications of graphene oxide for removal of cationic impurities, including Th(IV), U(VI), Pu(IV) and Am(III).

Example 2

Radionuclide Removal as a Function of pH

Figure 1B:
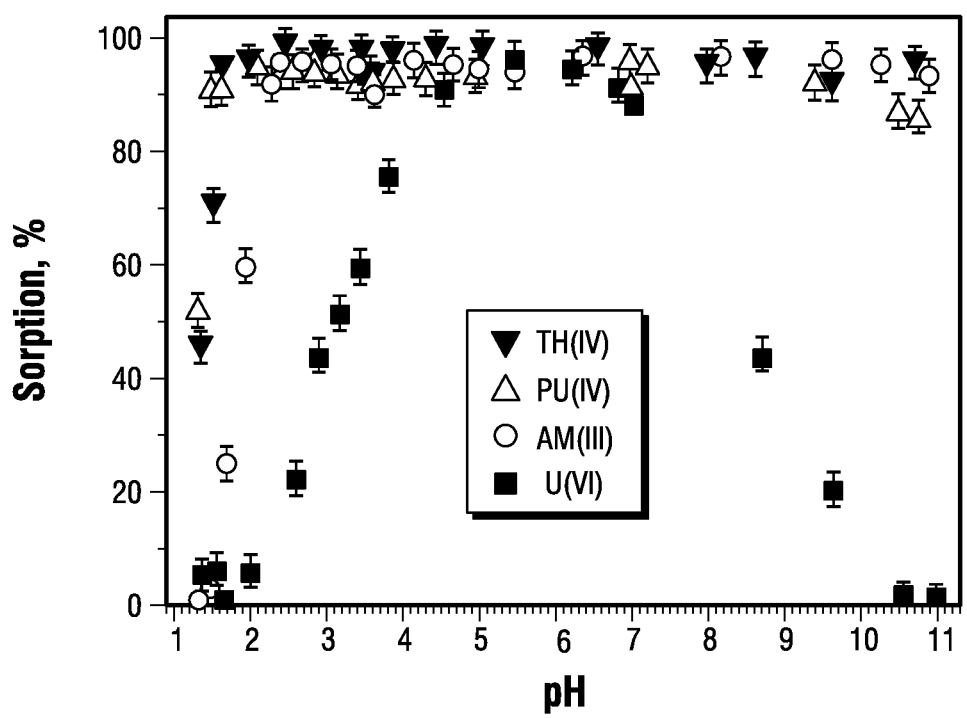
FIG. 1B shows pH-sorption edges for Th(IV), U(VI), Pu(IV) and Am(III).
Figure 1C:
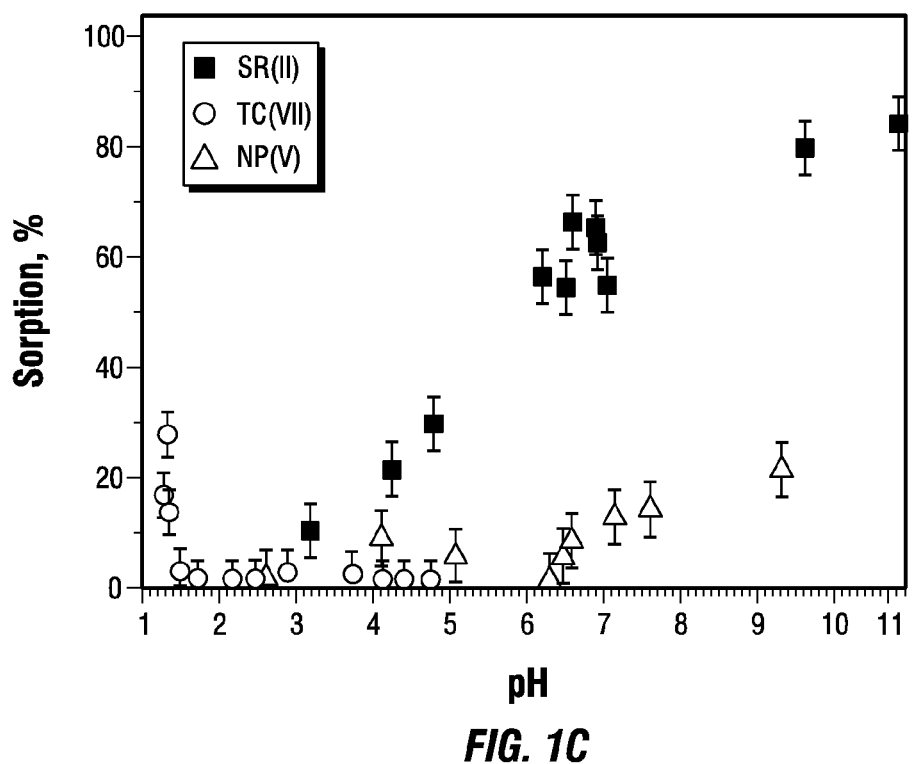
FIG. 1C shows pH-sorption edges for Sr(II), Tc(VII), and Np(V) at steady state. The concentrations are listed in Example 5.

FIGS. 1B and 1C show pH sorption edges for Sr(II), Tc(VII), Np(V), Th(IV), U(VI), Pu(IV) and Am(III). All of the radionuclides demonstrate typical S-shaped pH-edges for cations, except for Tc, which exists as the pertechnetate anion, $TcO_4^-$. This explains its sorption at low pH when the graphene oxide surface is protonated and positively charged. For Lewis "hard" cations such as the actinides Th(IV), Pu(IV) and Am(III), the sorption is high, even from acidic solutions with pH<2. For these cations, the sorption from neutral pH solutions was nearly quantitative, a result that is indicative of the prospects of its application in remediation of contaminated natural waters.

Example 3

Graphene Oxide's Radionuclide Sorption Capacities

Figure 2A:
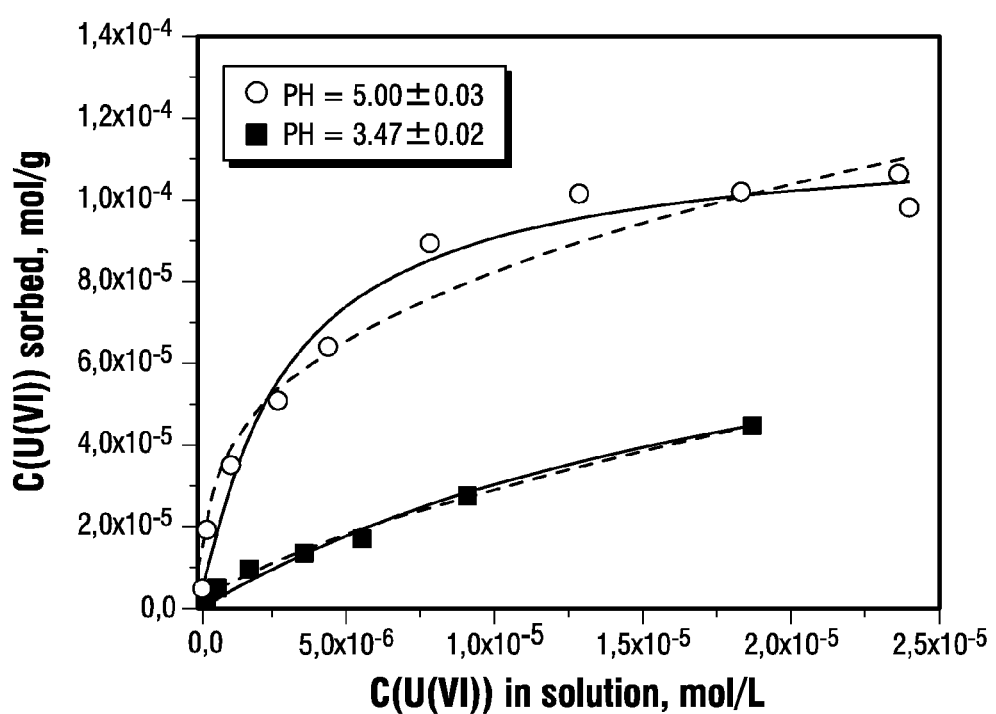
FIG. 2 shows sorption isotherms for U(VI) (FIG. 2A), Sr(II) (FIG. 2B), and Am(III) (FIG. 2C) in 0.01 M NaClO$_4$. Isotherms were fitted with both Langmuir (solid line) and Freundlich (dashed line) formalism. Parameters of fitting and sorption capacity ($Q_{max}$) are shown in Table 1 (Example 3). The concentrations of the graphene oxides are listed in Example 5.
Figure 2B:
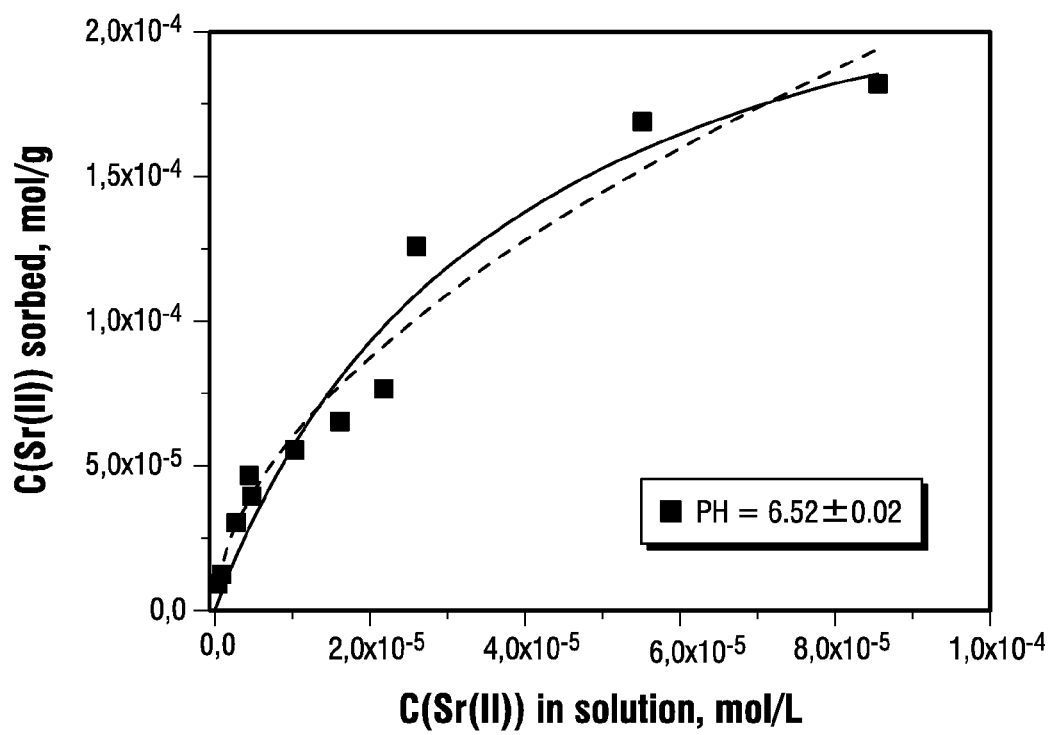
Figure 2C:
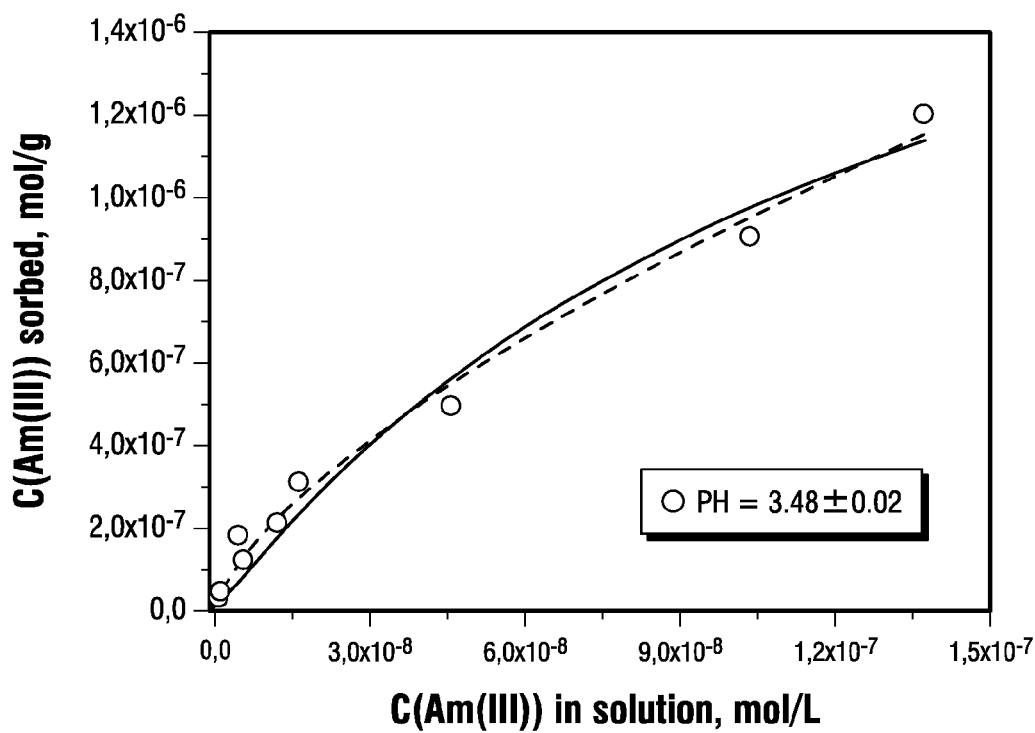

Graphene oxide demonstrates high sorption capacity towards U(VI), Sr(II) and Am(III) cations, as determined from sorption isotherms shown in FIG. 2. Even with a graphene oxide concentration of only 0.038 g/L, the saturation limit is not reached. The values for sorption capacity presented in FIG. 2 are calculated from experimental data using Langmuir formalism and Freundlich formalism. The experimental results are summarized in Table 1.

TABLE 1

Parameters for sorption of U(VI), Sr(II) and Am(III) on graphene oxide.

| | Langmuir formalism | | | Freundlich formalism | | |
|---|---|---|---|---|---|---|
| | $Q_{max}$, μmol/g | $K_L$, L/μmol | $R^2$ | $K_F$, $mol^{n-1} L^n$/g | n | $R^2$ |
| U(VI), pH = 3.5 | 97 ± 19 | 0.046 ± 0.014 | 0.98 | 0.004 ± 0.002 | 0.33 ± 0.04 | 0.95 |
| U(VI), pH = 5 | 116 ± 5 | 0.035 ± 0.064 | 0.97 | 0.078 ± 0.026 | 0.68 ± 0.03 | 0.99 |
| Sr(II), pH = 6.5 | 272 ± 35 | 0.026 ± 0.007 | 0.95 | 0.034 ± 0.017 | 0.55 ± 0.05 | 0.96 |
| Am(III), pH = 3.5 | 2 ± 1 | 7.034 ± 3.125 | 0.97 | 0.05 ± 0.03 | 0.67 ± 0.05 | 0.99 |

The above-mentioned results were obtained, despite the fact that the graphene oxide surface was far from saturation. While it is difficult to directly compare the sorption performance of different sorbents towards radionuclides since it is dependent on the precise experimental conditions, the sorption capacity of GO is much higher than that of activated carbon, bentonite clay and Fe(III) oxide, but close to the value determined for oxidized carbon nanotubes (CNTs).

However, sorption rates for oxidized CNTs are much slower than those of graphene oxide since much of the CNT surfaces are internal or inaccessible due to bundling, and the CNTs have been investigated for only a limited number of radionuclides and never with a large host of competing counterions. Moreover, CNT synthesis and subsequent oxidation is far more expensive than synthesis of graphene oxide, the latter coming from the one-pot treatment of graphite, thereby rendering graphene oxide more suitable for large-scale clean-up operations.

Example 4

Removal of Radionuclides from Simulated Nuclear Waste

Figure 3A:
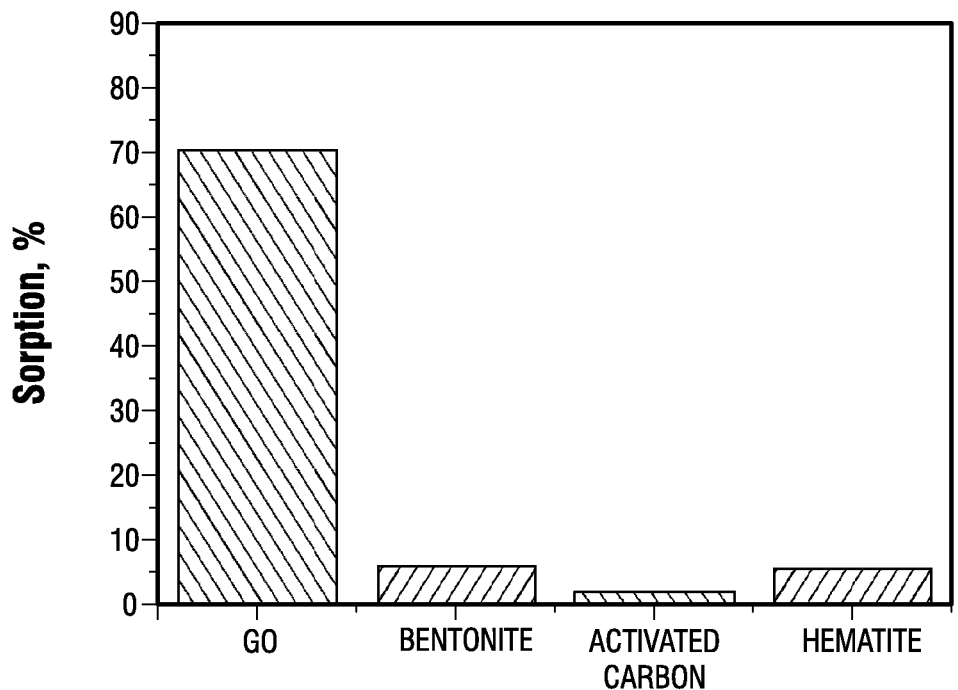
FIGS. 3A and 3B show the removal of U(VI) (FIG. 3A) and Pu(IV) (FIG. 3B) from simulated liquid nuclear wastes (see Table 1) by graphene oxide and some routinely used sorbents at equal mass concentrations.
Figure 3B:
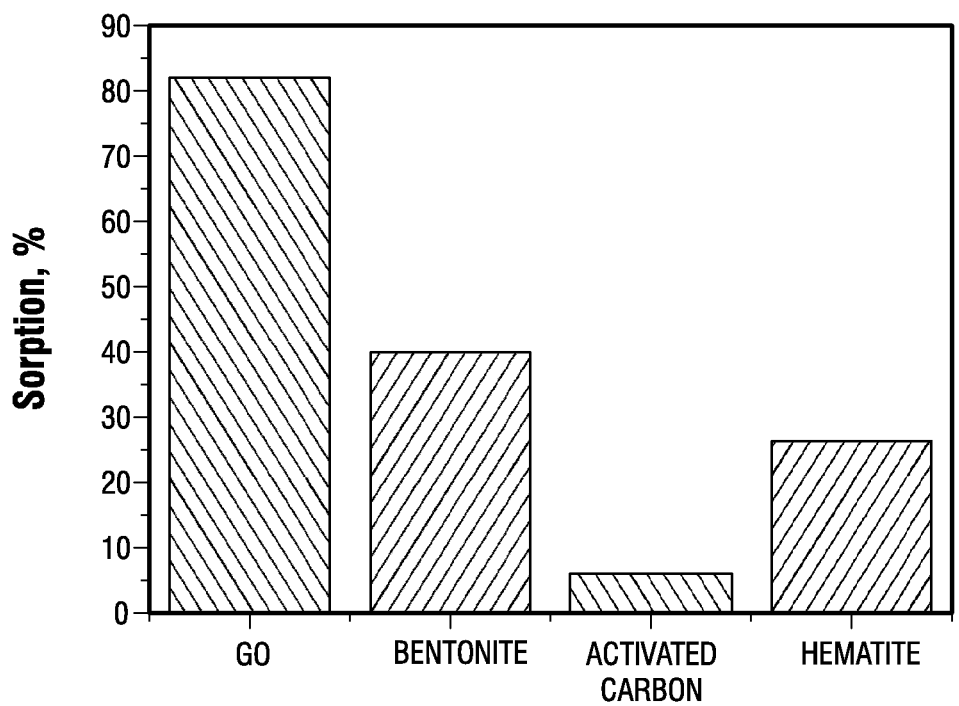

The removal of radionuclides from waste solutions was tested using simulated liquid nuclear wastes that contains U and Pu salts together with Na, Ca and various complexing substances such as carbonate, sulfate, acetate, and citrate that could potentially complicate sorption of radionuclides. See Table 2 for the complete list. Among the commonly used scavengers for cationic radionuclides (such as bentonite clays, granulated activated carbon and Fe(III) oxide), graphene oxide demonstrates the highest sorption ability towards actinides that form strong complexes in solutions with sulfate, citrate, carbonate and acetate. The comparison of the sorption of different sorbents towards U(VI) and Pu(IV) are presented in FIGS. 3A-3B. Remarkably, even for Pu(IV) that forms strong complexes in solution, the sorption onto graphene oxide was as high as 80%.

TABLE 2

Composition of Simulated Nuclear Waste Solution at pH 7.5.

| | Concentration, M |
|---|---|
| $Na^+$ | 1.500 |
| $Ca^{2+}$ | 0.005 |
| $NO_3^-$ | 0.806 |
| $CH_3COO^-$ | 0.339 |
| $C_2O_4^{2-}$ | 0.159 |
| $SO_4^{2-}$ | 0.014 |
| $Cl^-$ | 0.010 |
| $CO_3^{2-}$ | 0.005 |

Figure 3C:
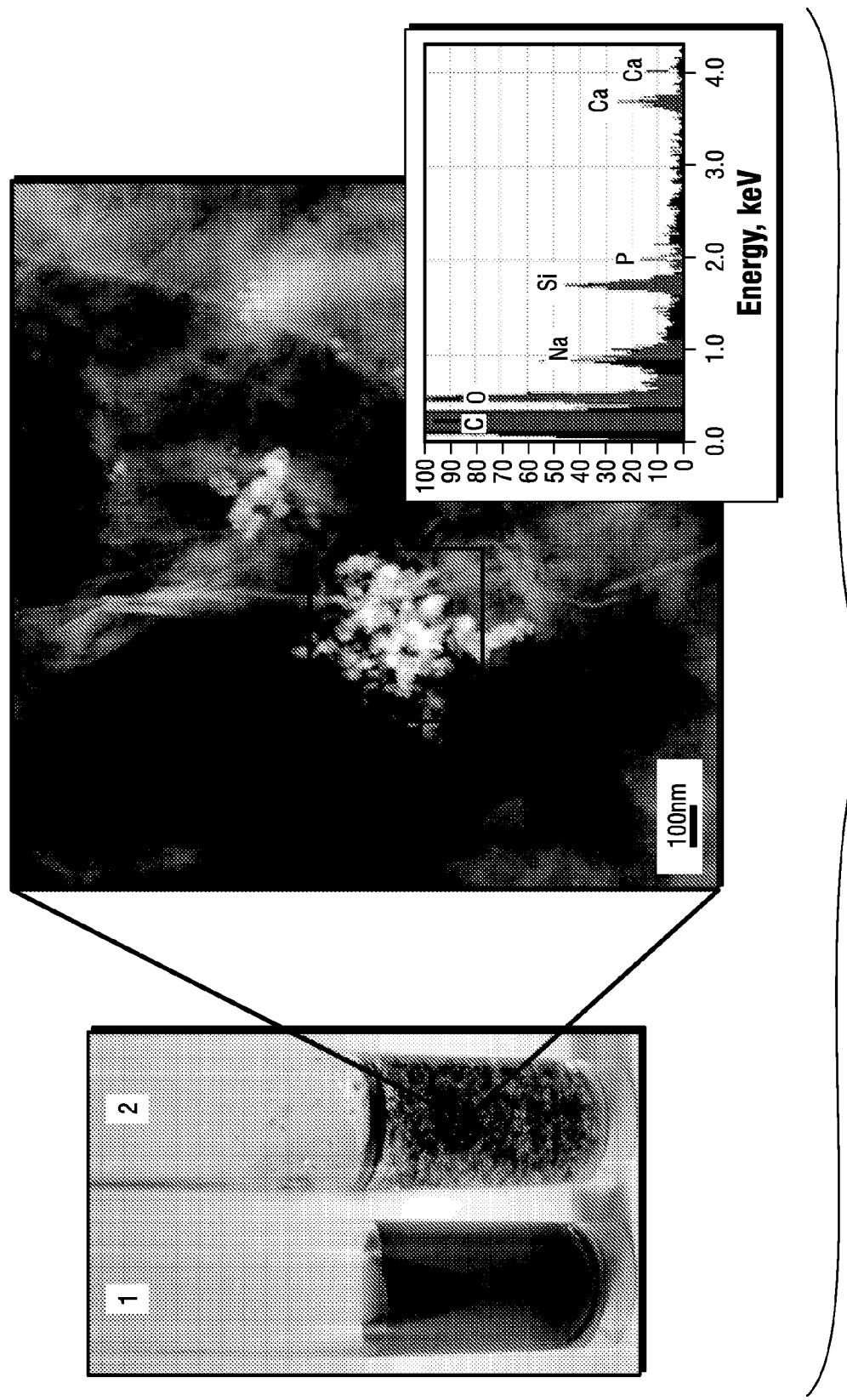
FIG. 3C shows coagulation of graphene oxide in a simulated nuclear waste solution. The left panel shows the initial graphene oxide suspension (labeled as 1), and the coagulated graphene oxide (labeled as 2). The right panel shows a scanning transmission electron microscope (STEM) and the corresponding EDX spectrum. The highlighted section in the STEM image shows the formation of nanoparticulate aggregates containing cations from simulated nuclear waste solution (Si and P are trace contaminants in graphene oxide from its preparation, as described in Example 5).

Upon the interaction of simulated nuclear waste solution with graphene oxide, coagulation occurred that resulted in visual changes of the suspension (FIG. 3C). A scanning transmission electron microscope (STEM) image of the graphene oxide coagulate with cations and a corresponding energy-dispersive X-ray (EDX) spectrum are presented in FIG. 3C. This is in agreement with the earlier observations that addition of such cations results in coagulation of graphene oxide. The most important observation for application of graphene oxide for radionuclides removal is that, despite the presence of high concentrations of cations that could compete with Pu for sorption sites, the sorption of Pu remains high. Thus, it is envisioned that the coagulation of graphene oxide suspension resulting from cations and radionuclides would enable the effective removal of radionuclides by filtration, reverse osmosis or sedimentation.

Figure 4A:
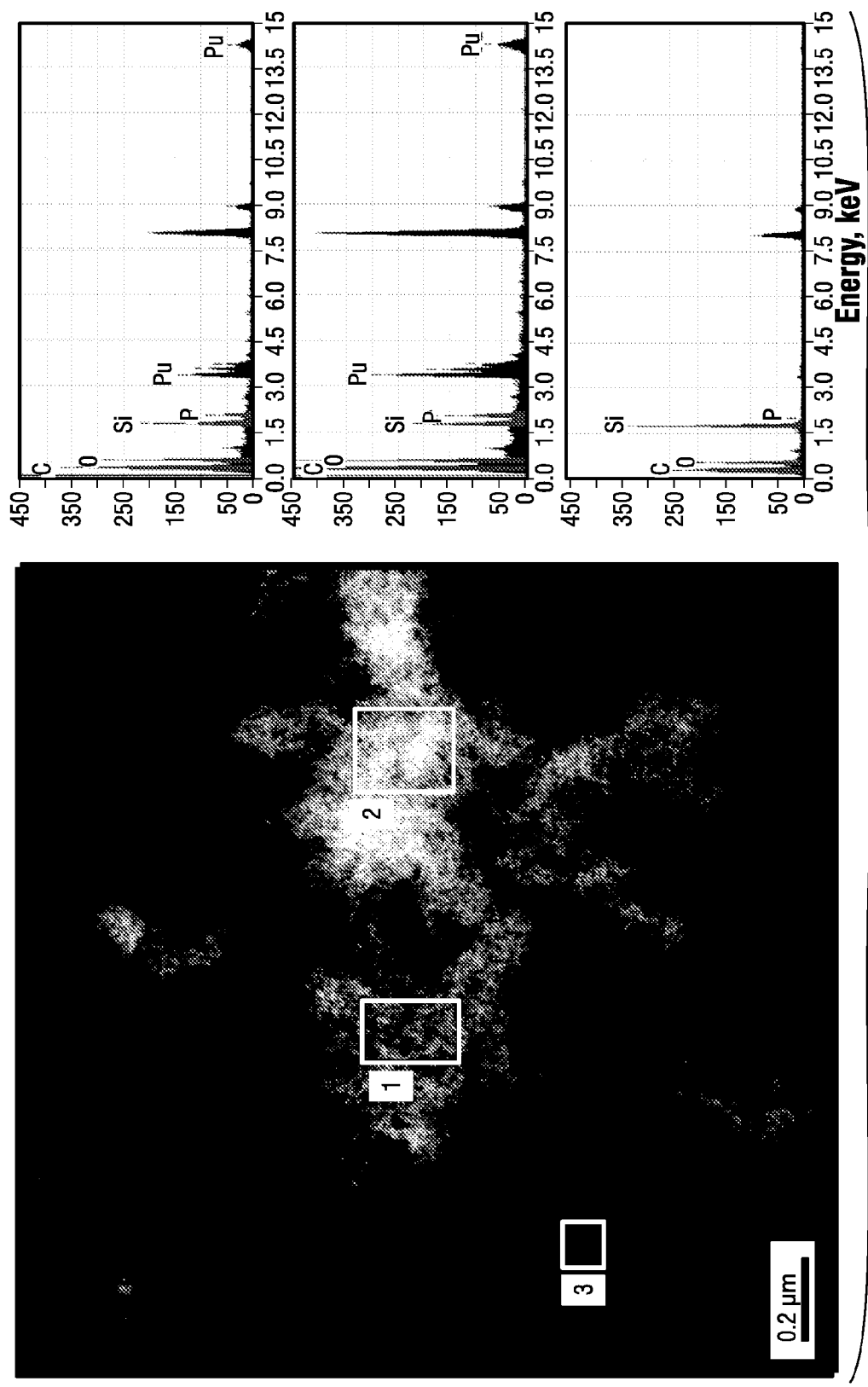
FIG. 4A is an STEM image of Pu(IV) on graphene oxide with EDX spectra corresponding to the different areas indicated on the STEM image. Pu-containing particles in graphene oxide could be observed by Z contrast of the STEM and from the EDX spectra of the highlighted regions.
Figure 4B:
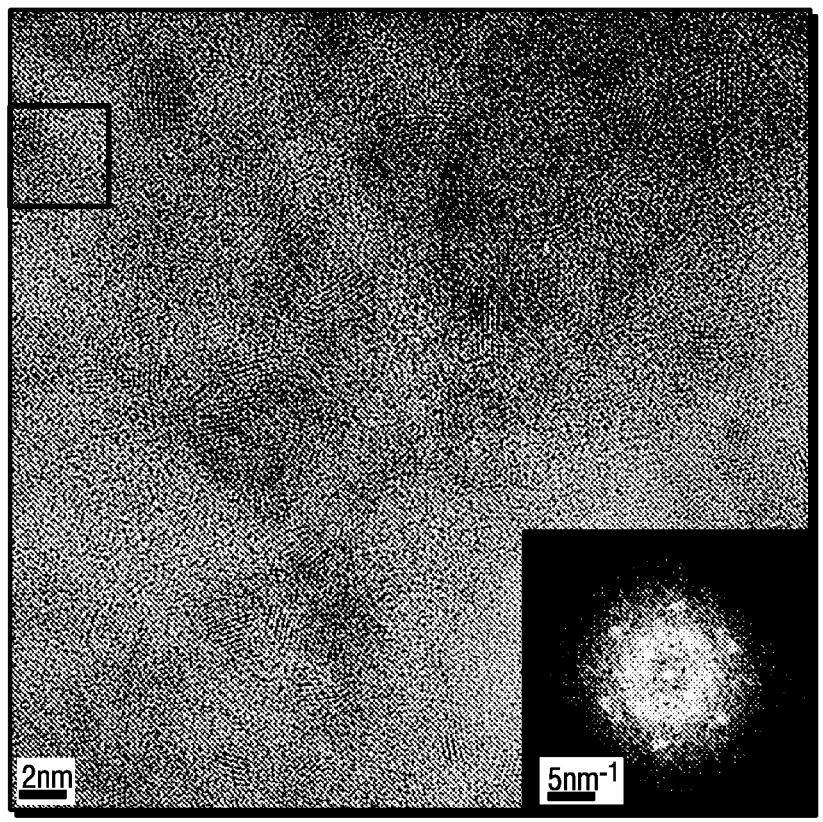
FIG. 4B is a high resolution transmission electron microscopy (HRTEM) image of PuO$_{2+x}$.nH$_2$O nanoparticles together with the FFT of individual nanoparticles from the highlighted region, indicating the cubic structure typical for PuO$_{2+x}$.

The interaction of Pu(VI) with graphene oxide results in its stabilization as Pu(IV) and formation of nanoparticulate $PuO_{2+x} \cdot nH_2O$ on the graphene oxide (FIG. 4A). Such stabilization could be explained by much higher sorption affinity of Pu(IV) towards the surfaces compared with Pu(V). The high resolution transition electron micrograph (HRTEM) image and EDX show that Pu is concentrated in aggregates of crystalline nanoparticles with an average size of 2 nm (FIG. 4B). The crystal structure of nanoparticles corresponds to cubic Fm3m lattice with d-spacing typical for $PuO_2$ as studied by FFT. The reduction to Pu(IV) is also supported by solvent extraction after Pu-leaching from graphene oxide at pH 0.7. Upon acid leaching (see Example 5), only ~10% of Pu(IV) was desorbed from graphene oxide after 15 minutes, indicating that Pu(IV) nanoparticles are kinetically stable. This is in concert with the earlier published data that Pu(IV) is minimally leached from sorbents and more kinetically stable than Pu(V) or Pu(VI).

The experimental data verifies the ability of graphene oxide to effectively sorb most toxic radionuclides from various solutions. Graphene oxide is found to be much more effective compared with bentonite clays, activated carbon and Fe(III) oxide in actinide removal from liquid nuclear wastes. Graphene oxide containing radionuclide could be easily coagulated and precipitated. The simplicity of industrial scale-up of graphene oxide, its high sorption capacity, and it ability to coagulate with cations makes it a promising new material for responsible radionuclide containment and removal.

Example 5

Experimental Protocols

Graphene oxide sample was prepared using the improved Hummer's method. Marcano et al. *ACS Nano* 2010. 4:4806-4814. Large-flake graphite (10.00 g, Sigma-Aldrich, CAS 7782-42-5, LOT 332461-2.5 KG, Batch #13802EH) was suspended in a 9:1 mixture of sulfuric and phosphoric acids (400 mL). Next, potassium permanganate (50.00 g, 0.3159 mol) was added in small portions over a period of 24 hours. After 5 days, the suspension was quenched with ice (1 kg) and the residual permanganate was reduced with $H_2O_2$ (30% aqueous, ~3 mL) until the suspension became yellow. The product was isolated by centrifugation at 319 g for 90 minutes (Sorvall T1, ThermoFisher Scientific) and subsequently washed with 10% HCl and water. The yellow-brown water suspension (190.0 g) was isolated, corresponding to 10 g of dry product. Gravimetric analysis and XPS shows 81% mass fraction of carbon in the dry product.

Sorption experiments were carried out in plastic vials for which sorption onto the vial walls was negligible under the experimental conditions. In the sorption experiments, radionuclides nitrates were added to graphene oxide suspension. Next, the pH was measured by a glass combined pH electrode (In Lab Expert Pro, Mettler Toledo) and adjusted by addition of small amounts of dilute $HClO_4$ or NaOH. After equilibration, the graphene oxide suspension was centrifuged at 40000 g for 20 minutes (Allegra 64R, Beckman Coulter) to separate radionuclides sorbed onto the graphene oxide. The sorption was calculated from the difference between the initial activity of the radionuclides and that measured after equilibration. The initial total concentration of radionuclides in the kinetic experiments and pH-dependence tests was $2.15 \cdot 10^{-7}$ M for $^{233}$U(VI), $1.17 \cdot 10^{-8}$ M for $^{239}$Pu(IV), $5.89 \cdot 10^{-14}$ M for $^{234}$Th(IV), $3.94 \cdot 10^{-10}$ M for $^{241}$Am(III), $3.94 \cdot 10^{-10}$ M for $^{239}$Np(V), $3.94 \cdot 10^{-10}$ M for $^{95}$Tc(VII) and $1.24 \cdot 10^{-7}$ M for $^{90}$Sr(II). The concentration of the graphene oxide suspension was 0.077 g/L in 0.01 M $NaClO_4$. In all cases, the total concentration of cations was much less than the solubility limit, and the graphene oxide/radionuclide ratio corresponded to a very high under-saturation of graphene oxide sorption sites.

To measure the sorption capacity of graphene oxide towards different radionuclides, the sorption isotherms were obtained using 0.038 g/L graphene oxide suspension in 0.01 M $NaClO_4$. The concentration of the cations was varied at constant pH values.

To demonstrate the performance of graphene oxide compared with other routinely used sorbents for radionuclide removal, experiments were conducted with simulated nuclear wastes containing high concentrations of complexing agents. The concentrations of actinides was equal to $8 \cdot 10^{-8}$ M for $^{233}$U(VI) and $3 \cdot 10^{-9}$ M for $^{239}$Pu(IV).

For HRTEM examination, the graphene oxide containing Pu samples were prepared such that the Pu(VI) at a total concentration of $1.14 \cdot 10^{-5}$ M was added to the graphene oxide suspensions having a concentration of 0.28 g/L at pH 4.8. After 18 hours, 99% of Pu was sorbed onto the graphene oxide. The precipitated material was deposited onto a carbon-coated TEM grid and analyzed using HRTEM (JEOL-2100F) at an accelerating voltage of 200 kV. EDX analysis was performed with a JED-2300 analyzer. For Pu leaching tests, concentrated $HClO_4$ was added to the suspensions to make them pH 0.7. After 15 minutes, the concentration of Pu in solution was measured.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method for removing actinides in cationic form from an aqueous solution, said method comprising the steps of:
   reacting graphite with potassium permanganate in a mixture of sulfuric and phosphoric acids to form graphene oxide;
   contacting said solution with said graphene oxide to adsorb said actinides onto said graphene oxide from said solution.

2. The method of claim 1, wherein the contacting comprises mixing said graphene oxides with the solution.

3. The method of claim 1, wherein said actinides in cationic form are selected from the group consisting of Am, Pu, Np, and U.

4. The method of claim 1, further comprising a step of separating said graphene oxide having said actinides adsorbed thereon from the solution, wherein the separating step occurs after the adsorption step.

5. The method of claim 4, wherein the separating step is selected from the group consisting of centrifugation, ultra-centrifugation, filtration, ultra-filtration, precipitation, electrophoresis, reverse osmosis, sedimentation, incubation, treatment with acids, treatment with bases, treatment with chelating agents, and combinations thereof.

6. The method of claim 4, wherein the separating step comprises the addition of a polymer to the solution, wherein the polymer addition leads to a precipitation of said graphene oxide having said actinides adsorbed thereon from the solution.

* * * * *